US012593831B2

(12) United States Patent
Drukenbrod et al.

(10) Patent No.: US 12,593,831 B2
(45) Date of Patent: Apr. 7, 2026

(54) ELLIPSOIDAL SEGMENTED FISHING LURE WITH A SCENT DISPERSION CHAMBER

(71) Applicant: Bambuie Bear, LLC, North Canton, OH (US)

(72) Inventors: Jacob Drukenbrod, North Canton, OH (US); Chadd Kasper, North Canton, OH (US)

( * ) Notice: Subject to any disclaimer, the term of this patent is extended or adjusted under 35 U.S.C. 154(b) by 0 days.

(21) Appl. No.: 18/731,075

(22) Filed: May 31, 2024

(65) Prior Publication Data

US 2025/0366451 A1    Dec. 4, 2025

(51) Int. Cl.
*A01K 85/16*    (2006.01)

(52) U.S. Cl.
CPC .................................... *A01K 85/16* (2013.01)

(58) Field of Classification Search
CPC ...... A01K 85/16; A01K 85/01; A01K 85/018; A01K 85/00
USPC ...... 43/4, 42.06, 42.24, 42.25, 42.53, 42.39, 43/42.26, 42.28, 42.36, 42.37, 42.09, 43/42.1, 42.2, 42.27, 42.31, 42.32, 42.34, 43/42.35, 42.38, 42.47, 42.48, 42.5, 43/42.51, 43.16, 43.6, 44.9
See application file for complete search history.

(56) References Cited

U.S. PATENT DOCUMENTS

| | | | | |
|---|---|---|---|---|
| 2,129,245 A | * | 9/1938 | Stenstrom | A01K 85/16 |
| | | | | 43/42.26 |
| 5,125,180 A | * | 6/1992 | Dean | A01K 97/00 |
| | | | | 43/4 |
| 5,517,781 A | * | 5/1996 | Paoletta, Jr. | A01K 85/01 |
| | | | | 43/42.24 |
| 6,412,214 B1 | * | 7/2002 | Sebastiani | A01K 85/16 |
| | | | | 43/42.06 |
| 6,655,075 B2 | * | 12/2003 | Bohn | A01K 85/02 |
| | | | | 43/43.6 |
| 8,266,838 B2 | * | 9/2012 | Parkinson | A01K 85/08 |
| | | | | 43/42.26 |
| 2005/0028424 A1 | * | 2/2005 | Poinski | A01K 85/16 |
| | | | | 43/42.06 |
| 2008/0202017 A1 | * | 8/2008 | Gregory | A01K 85/00 |
| | | | | 43/42.24 |
| 2008/0271359 A1 | * | 11/2008 | Moffitt | A01K 85/005 |
| | | | | 43/42.25 |
| 2011/0010983 A1 | * | 1/2011 | Briccetti | A01K 85/01 |
| | | | | 43/42.22 |

(Continued)

*Primary Examiner* — Zoe Tam Tran
(74) *Attorney, Agent, or Firm* — Daniel M. Cohn; Howard M. Cohn

(57)    ABSTRACT

A fishing lure formed of a body having a substantially bait fish shape provided with head and tail portions. A plurality of apertures equidistantly spaced along a longitudinal axis of the body. First and second openings formed on the top surface of the lure in fluid communication with an elongated channel extending therefrom along the length of the body of the lure. The channel has a plurality of openings extending from the channel to one or both side walls of the lure. The channel having horizontal portions which intersects the top surface of the lure at the first and second openings and extend downward to the channel. The channel being suitably sized and shaped for housing a predetermined quantity of scented agents so that the scented agents can be contained within said channel and selectively discharged when said fishing lure travels through the water.

2 Claims, 3 Drawing Sheets

(56) References Cited

U.S. PATENT DOCUMENTS

2012/0000113  A1*   1/2012  Davis ..................... A01K 85/00
                                                              43/42.28
2016/0081316  A1*   3/2016  Madala ................. A01K 83/00
                                                              43/42.06

* cited by examiner

118

120

122

ELLIPSOIDAL SEGMENTED FISHING LURE WITH A SCENT DISPERSION CHAMBER

FIELD OF INVENTION

The present invention relates generally to fishing lure and, more specifically, the present invention relates to a fishing lure for dispensing a scent lure for attracting and catching fish.

BACKGROUND OF INVENTION

Various types of fishing lures are known in the prior art, and most will catch fish. However, fisherman have found that they can improve the performance of a lure by applying a liquid, oil or gel to the lure that makes it smell more appealing to the predatory fish. Unfortunately, applying scent to a solid fishing lure, such as crank baits, has proven to be troublesome for a number of reasons.

One problem that arises immediately is the mess created by manually applying the scented oils, liquids or gels to an exterior surface of the lure. This causes the scent to impregnate the fisherman's skin, which is not desirable.

A further disadvantage is the fact that scents, especially in the form of oils and gels, have a tendency to distort the appearance of the fishing lure exterior surface once it is placed in the water.

Another drawback of applying scents to a fishing lure is the fact that such scents have a tendency to quickly dissolve into the water, and thus require frequent reapplication.

In response to these drawbacks, scented fishing lures were introduced to the prior art. One such example generally discloses a fishing lure formed from fibrous material which is impregnated with a fish attracting substance. However, the principal difficulty with devices of this type is impregnating the fibrous fishing lure body with the fish attractant substance. Furthermore, the fibrous material still has a tendency to release the scent too rapidly, thus requiring frequent resetting thereof.

Other disclosed examples include lures formed from fish food which provides a scent to attract fish. Another example is lures formed of materials that have been intermixed with scents such as fish oil intermixed with the plastic formulation from which the lure is made. In addition, a slowly dissolving lure made of a polymer with a fish scent attractant impregnated therein. Further examples include lures having a pouch for receiving bait or scented substances and a fishing scent delivery system comprising a bladder which releases a fishing scent material in the vicinity of a fishing lure.

Unfortunately, lures made of materials with scents impregnated therein have limited lifetimes and over time, the intensity of the scent diminishes, thus rendering the lure less appealing to fish.

Accordingly, a need remains for a scented fishing lure in order to overcome the above-noted shortcomings. The present invention satisfies such a need by providing a scented fishing lure that is easy to use, increases the chances of attracting a fish, and is adaptable in design to various fishing applications. Such a scented fishing lure provides a convenient way to use a scent for attracting more fish and drawing more strikes. The scent trail left by the lure convinces predatory fish that the lure is alive and represents an easy meal.

Such a scent trail also draws fish to the lure in dark, cloudy water, and thus helps the fish to find the lure and strike at it more accurately. The liquid, gel, or oils used for scent also have an attractive taste to the predatory fish, which encourages them to hold onto the bait for longer periods of time. This advantageously gives the fisherman an increased amount of time to respond to an initial strike, and to set the hook more securely. The scented fishing lure is more appealing than conventional fishing lures because it requires fewer reapplications of the scent and eliminates the need for the fisherman to directly contact the scented materials.

SUMMARY OF THE INVENTION

A fishing lure formed of a body having a substantially bait fish shape provided with head and tail portions. A plurality of apertures equidistantly spaced along a longitudinal axis of the body. First and second openings formed on the top surface of the lure in fluid communication with an elongated channel extending therefrom along the length of the body of the lure. The channel has a plurality of openings extending from the channel to one or both side walls of the lure. The channel having horizontal portions which intersects the top surface of the lure at the first and second openings and extend downward to the channel. The channel being is suitably sized and shaped for housing a predetermined quantity of scented agents so that the scented agents can be contained within said channel and selectively discharged when said fishing lure travels through the water.

A fishing lure formed of a body having a substantially bait fish shape provided with head and tail portions. First and second openings formed on the top surface of the lure in fluid communication with open ends of an elongated channel extending therefrom along the length of the body of the lure. The channel having horizontal portions which intersects the top surface of the lure at the first and second openings and extend downward to the channel.

A fishing lure having a channel therein extending from a location near the head of the lure to a location near the tail of the lure. The channel is closed at one end and open at the other end. The channel is filled with scented agents to attract fish. A series of holes extend through the wall of the lure and are located near the open end of the channel whereby the scented agents in the channel are selectively discharged from the open end of the channel and then through the series of openings through the sidewall of the lure when the fishing lure travels through the water.

A fishing lure having a chamber therein to store fish scented agents to attract fish. The stored fish scented agents being injected into the chamber through an open end. The scented agents in the chamber being are selectively discharged through the opening as the lure is pulled through the water and the lure being secured to a fishing line by tying the line around the body of the lure.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a side view of a fishing lure having a channel therethrough with holes through the sides of the lure to discharge scented agents to attract fish, in accordance with the present invention.

FIG. 2 is a side view of a fishing lure having a channel therethrough with holes at opposite ends thereof of the lure to discharge scented agents to attract fish, in accordance with the present invention.

FIG. 3 is a side view of a fishing lure having a channel therein with holes through the sides of the lure to discharge scented agents to attract fish, in accordance with the present invention.

FIG. 4 is a side view of a fishing lure having a separate chamber therein with a hole at one end s to discharge scented agents into holes in one end of the body of the lure, in accordance with the present invention.

FIG. 5 is a side view of a fishing lure having a chamber therein at one end thereof to store fish scented agents to attract fish, in accordance with the present invention.

FIG. 6 is a side view of a fishing lure having a chamber therein with an opening at one end thereof to store and dispense fish scented agents to attract fish, in accordance with the present invention.

DETAILED DESCRIPTION OF THE PREFERRED EMBODIMENT

Figure 1:
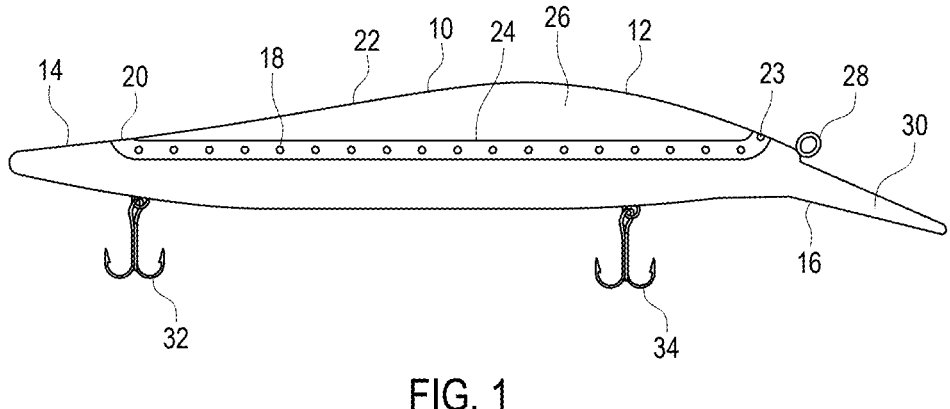

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Referring to FIG. 1, there is illustrated a fishing lure 10 formed of a body 12 having a substantially bait fish shape provided with head 14 and tail portions 16. The body 12 has a plurality of apertures equidistantly spaced along a longitudinal axis of the body. Openings 20 and 23 formed on the top surface 22 of the lure are in fluid communication with the single, elongated channel 24 extending therefrom along the length of the body 12 of the lure 10. The channel 24 has a plurality of openings 18 extending from the channel to one or both side walls 26 of the lure.

The channel 24 has a horizontal portion which intersects the top surface 22 of the lure at openings 20 and 23 and extend downward to the channel 24. The channel 24 is suitably sized and shaped for housing a predetermined quantity of scented agents so that the scented agents can be contained within said channel and selectively discharged when said fishing lure travels through the water.

The channel 24 can have open distal ends 20 and 23 above where the horizontal portion of the channel intersects the top surface 22. The openings 18 are sized for restricting the scented from prematurely exiting the body 12. The channel 24 can have a uniform diameter continuously extending along the length of the lure and along the vertical and horizontal portions, respectively, thereof. The body 12 has no other openings or apertures on or in the body except for the plurality of apertures 18, the openings 20 and 23, and the channel 24.

An eyelet 28 can be directly conjoined to the body 12 and extending outwardly therefrom. The eyelet 28 can be disposed adjacent to the tail head portion 30 of the lure and extend orthogonally outward therefrom and is adapted for a user to readily tether a fishing line thereto.

A plurality of treble hooks 32 and 34 can be directly and pivotally conjoined to the body 12 of the lure. The treble hooks extend downwardly from the body.

Figure 2:
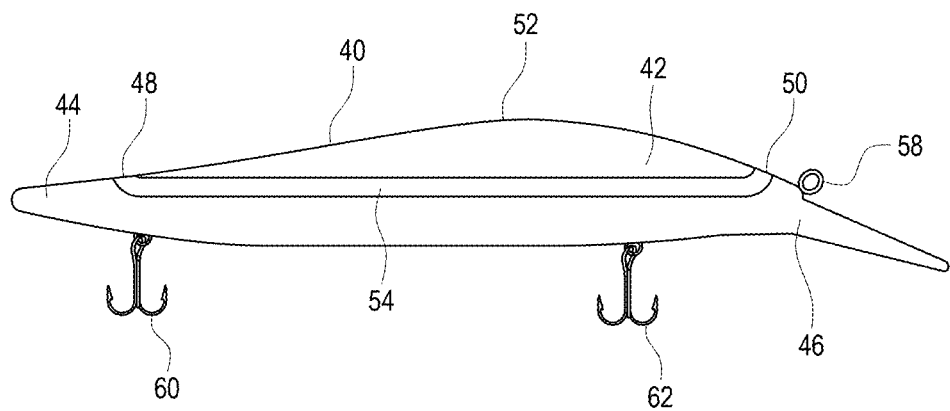

Referring to FIG. 2, there is illustrated a fishing lure 40 formed of a body 42 having a substantially bait fish shape and provided with a head 44 and tail portion 46. The body 42 has openings 48 and 50 formed on the top surface 52 of the lure. The openings 48 and 50 are in fluid communication with the elongated channel 54 extending therefrom along the length of the body 42 of the lure 40. The channel 54 has vertical end portions which intersects the top surface 52 of the lure at openings 48 and 50 and extend downward to the channel 54. The channel 54 is suitably sized and shaped for housing a predetermined quantity of scented agents so that the scented agents can be contained within the channel and selectively discharged from openings 48 and 50 when said fishing lure travels through the water.

The openings 48 and 50 are sized for restricting the scented from prematurely exiting the channel 54. The channel 54 can have a uniform diameter continuously extending along said the length of the lure. The body 42 has no other openings or apertures on or in the body except for the openings 48 and 50 and the channel 54.

An eyelet 58 can be directly conjoined to the body 42 and extending outwardly therefrom. The eyelet 58 can be disposed adjacent to the tail head portion 46 of the lure and extend orthogonally outward therefrom and is adapted for a user to readily tether a fishing line thereto.

A plurality of treble hooks 60 and 62 can be directly and pivotally conjoined to the body of the lure. The treble hooks extend downwardly from the body.

Figure 3:
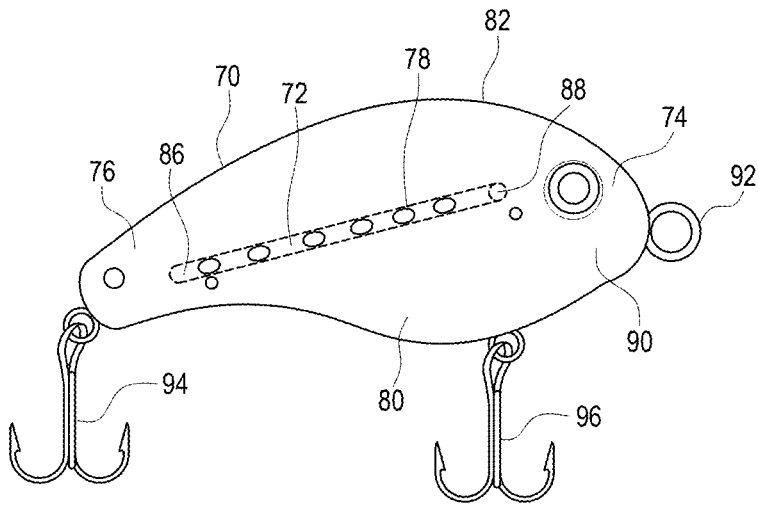

Referring to FIG. 3, there is illustrated a side view of a fishing lure 70 having a channel 72 therein extending from a position near the head 74 of the lure to a location near the tail 76 of the lure. One end 86 of the channel 72 is closed. The other end 88 is initially open and located near the opposite end 90. The end 88 can be closed after the channel 72 is filled with scented agents to attract fish. A series of holes 78 extend from the channel 72 through one or both sides 80 and 82 of the lure.

After the channel 72 is filled with scented agents to attract fish, the open end 88 is closed. The scented agents in the channel are selectively discharged from openings 78 through the sidewalls 80 and 82 of the lure 70 when the fishing lure travels through the water.

An eyelet 92 can be directly conjoined to the body of the lure 70 and extend outwardly therefrom. The eyelet 92 can be disposed adjacent to the head portion of the lure and extend orthogonally outward therefrom and is adapted for a user to readily tether a fishing line thereto.

A plurality of treble hooks 94 and 96 can be directly and pivotally conjoined to the body of the lure. The treble hooks extend downwardly from the body.

Figure 4:
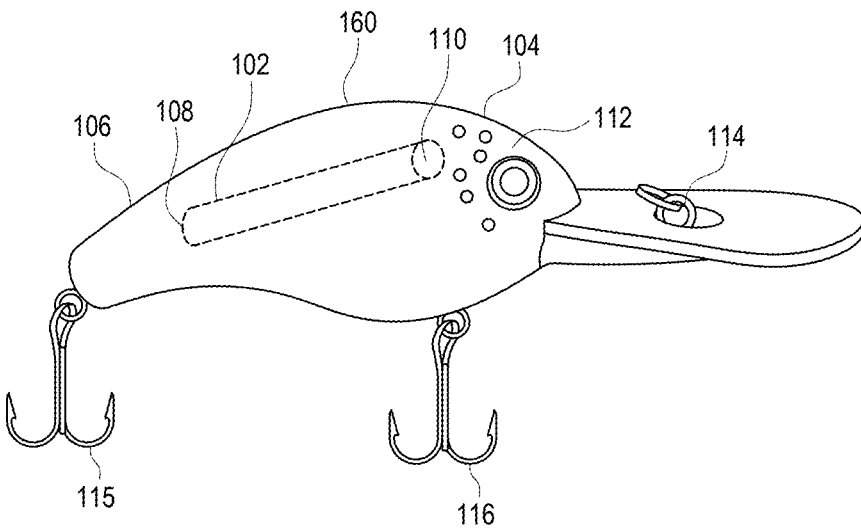

Referring to FIG. 4, there is illustrated a side view of a fishing lure 100 which can be constructed of clear plastic material. A separate channel 102 can extend from a position near the head 104 of the lure to a location near the tail 106 of the lure. One end 108 of the channel 102 is closed and the other end 110 is open after the channel 102 is filled with scented agents to attract fish. A series of holes 112 extend through the wall of the lure and are located near the open end 110 of the channel 102. The scented agents in the channel 102 are selectively discharged from the opening 110 and then through the openings 112 in the sidewall of the lure 100 when the fishing lure travels through the water.

An eyelet 114 can be directly conjoined to the body of the lure and extend outwardly therefrom. The eyelet 114 can be disposed adjacent to the head portion of the lure and extend orthogonally outward therefrom and is adapted for a user to readily tether a fishing line thereto.

A plurality of treble hooks 115 and 116 can be directly and pivotally conjoined to the body of the lure. The treble hooks extend downwardly from the body.

Figure 5:
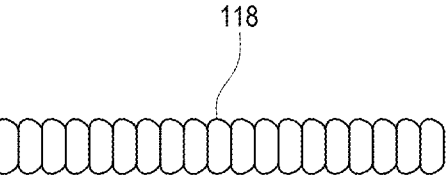
Figure 6:
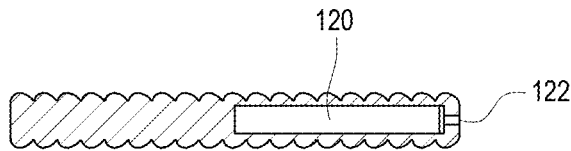

Referring to FIGS. 5 and 6, there is illustrated a side view of a fishing lure 118 having a chamber 120 therein and opening at one end 122 thereof to store fish scented agents to attract fish. The store fish scented agents are injected into the chamber 120 through the open end 122. The scented agents in the chamber 120 are selectively discharged from opening 122 as the lure 1118 is pulled through the water. The lure 1118 can be secured to a fishing line by tying the line around the body of the lure.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A fishing lure having a chamber therein to store a fish scented agent configured to attract fish;

the stored fish scented agent being injected into the chamber through an open end located at an end face of a body of the fishing lure; wherein the chamber is closed at an end opposite to the open end; wherein the chamber is integrally formed with the body of the fishing lure and is not removable therefrom; wherein the body of the fishing lure is made of a flexible material;

the fish scented agent in the chamber being selectively discharged through the open end as the fishing lure is pulled through the water, wherein the body of the fishing lure is devoid of any eyelet for attaching a fishing line and wherein the fishing lure is secured to a fishing line by tying the line around the body of the fishing lure;

wherein the open end is sized for restricting the fish scented agent from prematurely exiting the fishing lure, wherein the chamber has a uniform diameter and is a piston-free cavity with the open end configured to passively discharge the scented configured to passively discharge the fish scented agent solely through hydrodynamic pressure differential created when the fishing lure is pulled through water.

2. The fishing lure according to claim 1, wherein the body of the fishing lure has an elongated form, and wherein an outer surface of the body comprises a series of small ellipsoidal segments arranged consecutively along a longitudinal axis of the elongated form, such that a profile of the body taken along the longitudinal axis exhibits a continuous wavy contour.

\* \* \* \* \*